June 2, 1964  K. G. KLEMA  3,135,517
BROADCAST SPREADER

Filed Dec. 26, 1962  2 Sheets-Sheet 1

Kenneth G. Klema
INVENTOR.

United States Patent Office 3,135,517
Patented June 2, 1964

3,135,517
BROADCAST SPREADER
Kenneth G. Klema, Racine, Wis., assignor to
S. C. Johnson & Son, Inc., Racine, Wis.
Filed Dec. 26, 1962, Ser. No. 246,885
1 Claim. (Cl. 275—12)

This application is a continuation-in-part of my prior application Serial No. 114,579, filed April 4, 1961, and now abandoned.

This invention relates to a dispensing mechanism for use in a spreader for dispensing and spreading dry, granular material such as fertilizers, seed and the like.

The object of the invention is to provide a dispensing mechanism which will not easily become jammed when dispensing and spreading dry granular material. A further object of the invention is to provide a dispensing mechanism for dry granular material which will permit the granular material to be dispensed only when the mechanism is deliberately activated.

Generally described, the invention comprises, in a spreader for dry granular material, a spreading mechanism comprising a horizontally disposed rotor having a plurality of upright vanes disposed generally radially from the center of the rotor, the vanes having two segments separated by spacial interruptions at positions substantially equidistant from the center of the rotor, a fixed arcuate skirt depending from above the rotor into the spacial interruptions in the upright radial vanes, means for the controlled deposit of dry granular material onto the horizontally disposed rotor between the depending skirt and the center of the rotor, and means for rotating the rotor.

For enhanced results, the rotor will have a roughened upper surface as, for example, when provided by a series of concentric grooves and ridges. Finally, for best results, the two portions of the upright vanes which are disposed generally radially will be staggered in their linear relationship to each other so that the outermost segment of each vane will be somewhat behind the first segment with respect to the rotor's direction of travel.

The invention will be further described with reference to the drawings.

Figure 1:
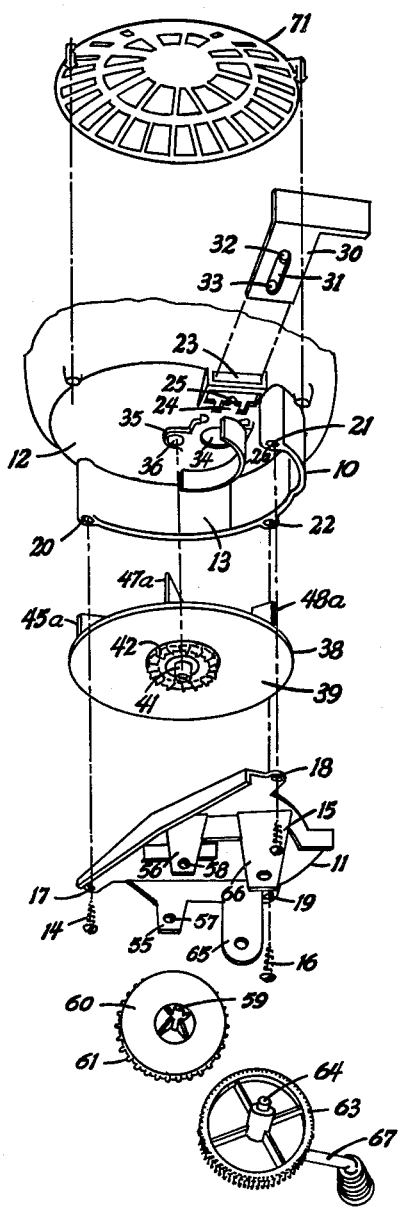
FIG. 1 is an exploded perspective view of the dispensing mechanism of the invention.

The dispenser unit includes a housing shown generally as 10 having a bottom wall 11 and a top wall 12 disposed in substantially parallel relation to each other.

The housing 10 also includes an arcuate-shaped side wall 13, which is curved around the same radius as the outer periphery of the top wall 12. The side wall 13 is preferably formed integrally with the top wall 12 and is secured at its lower edge to the upper face of the bottom wall 11. The housing 10 is preferably made from a suitable plastic material such as, high impact styrene, and may be secured to the bottom wall 11 by suitable means such as, for example, by screws 14, 15 and 16 extending through holes 17, 18 and 19 in the bottom wall 11 and finally into positions designated 20, 21 and 22 in the housing. The arc of the side wall 13 is approximately 180° leaving an opening of approximately the same size.

Figure 3:
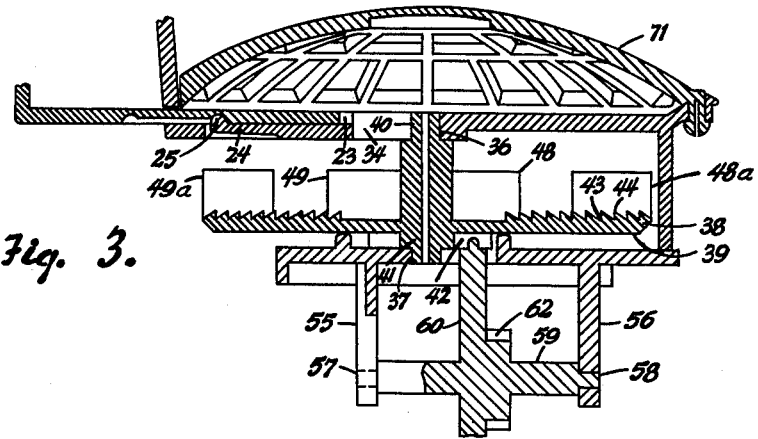
FIG. 3 is a sectional view taken substantially along the line 3—3 in FIG. 4.

The top wall 12 of the housing 10 has a downwardly projecting upwardly opening, elongated, straight channel portion 23 formed therein which can be seen in FIGS. 1 and 3. The channel portion 23 extends inwardly from one peripheral edge of the top wall 12, and includes a tongue 24 having an upwardly extending projection 25 on the free end thereof.

An elongated slide 30 which is complementary in transverse cross-sectional size and shape to the channel portion 23 of the housing 10 is slidably mounted in the channel 23 for reciprocation relative thereto. The slide 30 has an elongated recess 31 formed in the lower face thereof, the recess 31 extending along the longitudinal center line of the slide 30 in such position that throughout longitudinal movement of the slide 30 into and out of the channel 23 the projection 25 rides along in the slot 31. Downwardly extending depressions 32 and 33 are formed in the inner and outer ends of the slot 31 and the projection 25 is so disposed in the slot 31 that when the slide 30 is disposed in full inwardly disposed position in the channel 23, the projection 25 is disposed in the depression 32, and when the slide 30 is so disposed in full outwardly projecting position, the projection 25 is disposed in the depression 33. Thus, it will be seen that the projection 25 affords an abutment member which is effective to hold the slide 30 against the complete withdrawal from the channel 23, and also to frictionally hold the slide 30 in full outwardly or inwardly projecting position.

The slide 30 is of such length that when it is disposed in full inwardly projecting position, it extends across the opening 34 to close it.

Figure 5:
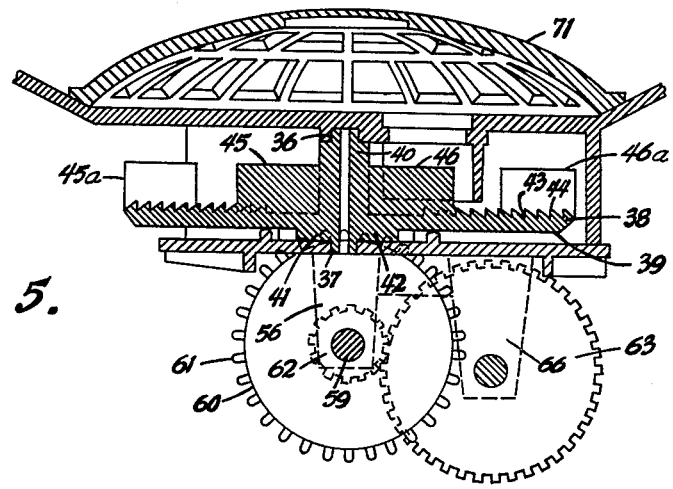
FIG. 5 is a sectional view taken substantially along the line 5—5 in FIG. 4.

A downwardly projecting portion 35 of the top wall 12 has a recess 36 formed therein to afford a bearing, FIGS. 1, 3 and 5. Another bearing in the form of an opening 37, FIGS. 3 and 5 in the bottom wall 11 of the housing 10 is disposed in axial alignment with the opening 36. A rotor 38, which includes a circular plate portion 39 having axially aligned shafts 40 and 41 projecting outwardly from opposite sides of the radial center thereof is rotatably mounted in the housing 10 with the shafts 40 and 41 journalled in the bearing openings 36 and 37, respectively. A gear 42 is formed on the lower face of the plate 39 in parallel juxtaposition thereto, and is disposed in engagement with the upper face of the bottom wall 11 of the housing 10, FIGS. 1 and 3 for best views.

The top surface of the circular plate portion of rotor 38 is roughened as, for example, by a plurality of concentric depressions 43 and ridges 44. The rotor also possesses a plurality of upright vanes 45, 46, 47, 48, 49 and 50 all shown only in FIG. 4, disposed generally radially from the center of the rotor. The vanes have two segments separated by spacial interruptions at positions substantially equidistant from the center of the rotor. The outermost segments of these vanes have been assigned numbers 45a to 50a in the drawings for convenience of association. These outermost segments of the radially disposed upright vanes are staggered in their linear relationship with their matching innermost segment so that the outermost segments are somewhat behind the innermost segment with respect to the rotor's direction of travel.

Figure 4:
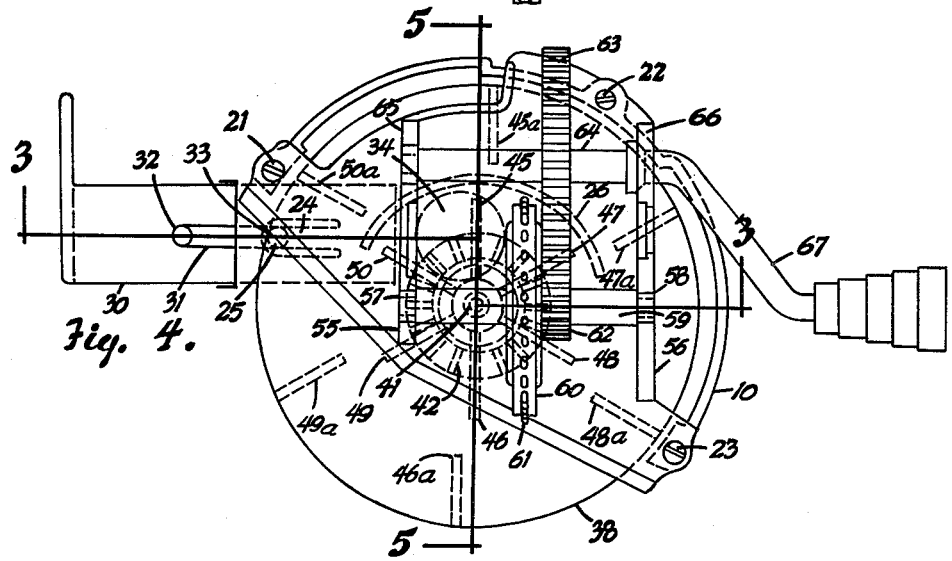
FIG. 4 is an enlarged bottom plan view of the dispenser unit shown in FIG. 1 looking from top to bottom.

Depending from the under surface of top wall 12 of housing 10 is an arcuate skirt 26 located substantially equidistant from the arcuate wall 13 of housing 10 and of sufficient length so that it embraces opening 34 in top wall 12 and also the two pie-shaped spaces formed by adjacent pairs of innermost vane segments as for example the two pie-shaped spaces formed respectively by vanes 50 and 45, and 45 and 47 as shown in FIG. 4.

Two mounting brackets 55 and 56 in the form of ears formed integral with the bottom wall 11 and projecting downwardly therefrom are disposed in parallel spaced relation to each other. The mounting brackets 55 and 56 have openings 57 and 58 extending through the lower end portions thereof in axial alignment with each other, and a shaft 59 extends between the brackets 55 and 56 and is journalled in the openings 57 and 58. A gear wheel 60, having teeth 61 in the form of pins projecting radially outwardly from the periphery of the body of the gear wheel 60, is formed on the longitudinal central portion of the shaft 59, and is so positioned relative to the rotor 38 that the pins 61 are operatively engaged with the teeth on the gear 42.

Another gear 62, which is substantially smaller than the gear 60 is formed on the shaft 59 between the gear 60 and the mounting bracket 56, FIGS. 4 and 5. The gear 62 is operatively engaged with another larger gear 63 formed on a shaft 64 which extends between, and is journalled in two other mounting brackets 65 and 66 which project downwardly from the bottom wall 12 of housing 10. The brackets 65 and 66 are preferably disposed in the same planes as the brackets 55 and 56 respectively. A crank 67 is formed integrally with the shaft 64 and projects outwardly from the bracket 66. The crank 67 projects outwardly beyond the housing 10 on the opposite side thereof from the slide 30, and is operable upon rotation to rotate the gear 63, and thereby rotate the gears 62, 60 and 42 and the rotor 38, for the purpose which will be discussed in greater detail presently.

The plate 39 of rotor 38, at its outer peripheral edge is spaced from the inner face of the side wall of the housing 10 a short distance such as, for example, one-sixteenth of an inch, and the upper edges of the vanes 45 to 50 are likewise spaced from the channel portion 23 of the top wall 12 of the housing 10 a short distance such as, for example, one-sixteenth of an inch. Also the innermost and outermost ends of the outermost and innermost segments of the vanes respectively are positioned a suitable distance, for example about one-sixteenth of an inch from the depending skirt 26.

All of the parts of the dispenser may be made of suitable plastic material such as, for example, high impact styrene, and it has been found that by lubricating the bearings of the unit with a suitable silicone oil such as, for example, dimethylpolysiloxene, the rotating parts of the unit may be rotated at normal rotating speeds, and for a practical effective life without seizure or wear sufficient to cause the dispensing unit to become inoperative for spreading particled material such as, for example, dry commercial fertilizer, and the like, in accordance with the present invention.

In use in a spreader for distributing dry granular material, the dispensing mechanism of the invention will be attached to a hopper such as designated 70 in FIG. 1. This can be done by molding the upper wall 12 and arcuate wall 13 integrally with hopper 70. Alternately, the whole dispensing mechanism including the upper horizontal wall 12 could be secured in any suitable way to the bottom of a hopper having its own bottom wall by any suitable means as, for example, by a set of screws not shown. In such case it would be necessary for the bottom wall of the hopper to have an outlet matching opening 34 of the top wall 12 of housing 10 to permit the granular material to flow from the hopper 70 through opening 34 onto rotor plates 39 when slide 30 is moved into its outermost position. Screen 71 is optional. It fits over opening 34 in top wall 12 and prevents the entry of foreign material or conglomerations of the product being dispensed into opening 34 with resultant closing of it or jamming of the rotor 38.

The dispenser unit of the invention can be oriented on the hopper to obtain the distribution pattern desired— straight ahead of the operator, or to the front right or front left.

Figure 2:
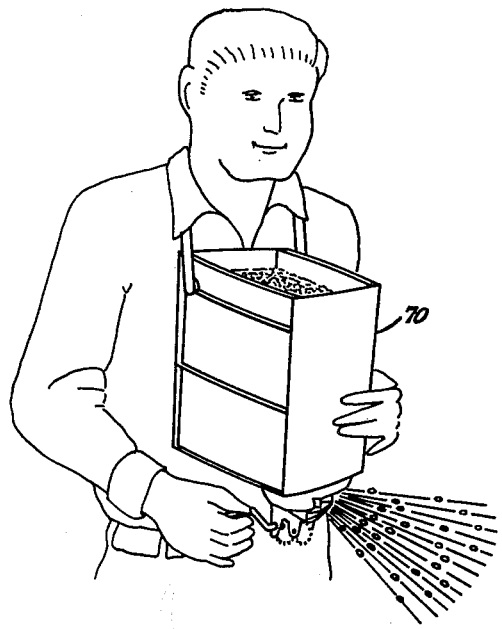
FIG. 2 is a perspective view of the dispensing mechanism integrally mounted on a hopper containing a dry granular material being dispensed.

In use, a distribution unit comprising a hopper and dispensing unit of the invention may be suspended from the neck of the operator in the manner shown in FIG. 2. The operator will pull the slide 30 into full outwardly extending position to open, then walk across the lawn or other surface on which it is desired to spread the contents of the hopper, and, while walking, turn the crank 67 in a clockwise direction, as viewed in FIG. 2, with his right hand. During this operation, the purchaser may steady the hopper 70 against his chest with his left hand, as viewed in FIG. 1. Rotation of the crank 67 in the aforementioned clockwise direction is effective to rotate the rotor 38 in a clockwise direction as viewed looking down on the unit. This rotation of the rotor 38 is effective to sweep the material passing downwardly from the hopper 70 through the opening 34 outwardly through the front opening in the housing 10 of the dispenser unit and throw it outwardly therefrom in a broadcast pattern. As stated above, the position of the broadcast pattern will depend on the orientation of the dispensing mechanism with the hopper. When oriented generally as shown in FIG. 2 the pattern will extend from substantially directly in front of the operator to a line which extends outwardly to the left of the operator at an angle of approximately seventy degrees from the line directly in front of the operator.

It has been found that with a dispenser unit having a rotor of substantially three and three-eighths inches diameter; with the opening 34 being substantially five-eighths inch in diameter; the gear ratio between the crank 67 and the rotor 38 being 1 to 7; the throw of crank 67 being approximately one and one-eighth inch; and the vanes 45 to 50 being approximately seven-sixteenths of an inch in height, commercial fertilizer of the aforementioned type, having a particle size of approximately one-sixteenth of an inch, may be readily spread, relatively uniformly, in a single operation by a relatively inexperienced operator over a lawn surface, or the like, within practical limits of the optimum rate of coverage for that particular fertilizer, namely, twelve pounds of the fertilizer for five thousand square feet of lawn.

With the distributor unit constructed in the aforementioned manner, and using fertilizer having a particle size of the aforementioned one-sixteenth of an inch in diameter, it has been found that the pattern of throw of the fertilizer extends outwardly to the left of the average operator a distance of from eight to ten feet. With the pattern of throw of the fertilizer terminating at the right edge thereof, as viewed through the operator's eyes substantially directly in front of him, the operator may walk in a straight line across a lawn, or the like, while turning the crank 67, to distribute the fertilizer to his left in a swath 8 to 10 feet wide. He may then turn 180° and walk back on the same line, distributing another swath 8 or 10 feet to his left, which overlaps with the previous swath. Thus, it will be seen that every two swaths may be laid down with the operator walking along the same straight line. Hence, it is only necessary for the operator to realign himself every other swath, and this may be readily accomplished by moving beyond the outer edge of his last swath a distance equal to the width of his previous swath.

The unique construction of the housing of the present dispensing mechanism and especially that of the rotor 38 and the upper wall 12 including depending arcuate skirt 26, prevents jamming of the mechanism during operation and accidental spillage of the product when the rotor is not in motion. As mentioned earlier, the arcuate skirt 26 which depends from top wall 12 of housing 10 is located substantially equidistant from arcuate wall 13 of housing 10 and is of sufficient length so that it embraces opening 34 in top wall 12 and also two pie-shaped spaces formed by innermost vane segments, as for example by vanes 50 and 45 and 45 and 47 as shown in FIG. 4.

When slide 30 is moved to its outermost position, product flows through opening 34 onto rotor plate 39. As can be seen in FIG. 4, product flowing downwardly through opening 34 will fall into no more than two of the pie-shaped spaces formed, for example, in FIG. 4, by vanes 47 and 50, arcuate skirt 26, bottom wall 11 and top wall 12 of housing 10. With this limited amount of product on rotor 38, it is always possible to start the rotor by turning crank 67. In the absence of this structural arrangement so much product would flow onto the rotor that it would be impossible to start it by simply turning the crank. The concentric ridges and depressions on the top surface of rotor plate 39 prevent the small amount of product which may pass under the vanes from rolling off the rotor. Yet, these features are not prominent enough to present any significant impediment to distribution of product when the rotor is in motion. The spacial interruptions between the inner and outermost segments of each vane accommodates the depending arcuate skirt 26 during rotation of rotor 38. The outermost segment of each vane is positioned slightly behind the innermost segment with respect to the rotor's direction of travel. The innermost segment of a vane sweeps product from the area under opening 34 and inside the depending arcuate skirt 26. As the product is swept past the end of arcuate skirt 26, it is thrown tangentially away from the arc of the skirt. Because of the momentary loss of force pushing the product, due to the spacial interruption in each vane, the speed of the product immediately diminishes. To accommodate the position of the slowed product the outermost segment of each vane is positioned slightly behind the innermost segment with respect to the rotation of the rotor. The product pushed by the innermost segment of a particular vane is then caught by the outermost segment of the same vane and thrust off the rotor. Were it not for this arrangement some jamming of product would occur around the end of arcuate skirt 35 as the vanes pass it with substantial feedback of product occuring through the spaces between the skirt 26 and the inner and outer ends of the outermost and innermost segments respectively of each vane. This would adversely affect the smooth operation of the dispensing mechanism and the uniformity of the spreading pattern.

While I have illustrated and described the preferred embodiment of my invention, it is to be understood that this is capable of variation and modification, and I therefore do not wish to be limited to the precise details set forth, but desire to avail myself of such changes and alterations as fall within the purview of the following claim.

It is claimed and desired to secure by Letters Patent:

In a manual spreader for a dry, substantially granular material, a spreading mechanism comprising:

(a) a housing having horizontally disposed top and bottom walls connected by a vertically disposed arcuate side wall;

(b) a horizontally disposed, plate-like, rotor mounted in said housing having a plurality of upright, substantially radially disposed vanes, each vane consisting of inner and outer segments separated by spacial interruptions at points substantially equidistant from the center of said rotor, and the outer segment of each of said vanes being positioned slightly behind the inner segment of the same vane with respect to the rotor's direction of travel, and the upper surface of said rotor having a plurality of concentric depressions;

(c) a means for preventing jamming comprising a fixed arcuate skirt substantially parallel to said arcuate side wall, depending from said top wall into the spacial interruptions in said upright radial vanes;

(d) means for the controlled deposit of dry, granular material onto an area of said rotor said area defined by:
  (1) the innermost segments of pairs of adjacent radially disposed vanes,
  (2) said depending arcuate skirt, and,
  (3) the center of said rotor; and, (e) means for manually rotating said rotor.

References Cited in the file of this patent

UNITED STATES PATENTS

| | | |
|---|---|---|
| Re. 10,209 | Speicher | Sept. 26, 1882 |
| 321,878 | Amundson et al. | July 7, 1885 |
| 363,053 | Easterling | May 17, 1887 |
| 2,514,962 | McElhatton | July 11, 1950 |
| 2,967,604 | Topp | Jan. 10, 1961 |